United States Patent [19]

Jungerhans

[11] Patent Number: 4,578,214
[45] Date of Patent: Mar. 25, 1986

[54] PROCESS FOR AMMONIA SYNGAS MANUFACTURE

[75] Inventor: Robert R. J. Jungerhans, Pasadena, Calif.

[73] Assignee: C F Braun & Co., Alhambra, Calif.

[21] Appl. No.: 577,643

[22] Filed: Feb. 6, 1984

[51] Int. Cl.$^4$ ............................................. C01C 1/04
[52] U.S. Cl. .................................. 252/376; 252/377; 423/359
[58] Field of Search ............... 423/359, 360, 361; 252/376, 377

[56] References Cited

U.S. PATENT DOCUMENTS

| | | | |
|---|---|---|---|
| 3,469,944 | 9/1969 | Bocard et al. | 423/650 |
| 4,200,682 | 4/1980 | Sederquist | 429/17 |
| 4,337,170 | 6/1982 | Fuderer | 252/373 |
| 4,375,363 | 3/1983 | Fuderer | 55/25 |
| 4,414,191 | 11/1983 | Fuderer | 423/359 |

OTHER PUBLICATIONS

"Ammonia Process Boasts Higher Efficiency", *Oil & Gas Journal* (May 4, 1981), vol. 79, No. 18, pp. 270–280.

Primary Examiner—John Doll
Assistant Examiner—Wayne A. Langel
Attorney, Agent, or Firm—Lyon & Lyon

[57] ABSTRACT

A process for producing ammonia synthesis gas in which a pressure swing adsorption unit is utilized to replace former $CO_2$ removal, methanation, drying and purification steps. To increase the efficiency of the process, a hydrogen fuel cell is utilized to generate electricity and a high purity nitrogen purge stream for a pressure swing absorption unit. Accordingly, after reforming and high temperature catalytic shift conversion, the feed stream is divided into a first stream to feed the fuel cell and a second stream which is directly introduced to the pressure swing adsorption unit. After the first stream is reacted in the fuel cell, a nitrogen rich stream is passed to a de-oxygenation unit and then utilized as the pressure swing adsorption purge stream.

8 Claims, 2 Drawing Figures

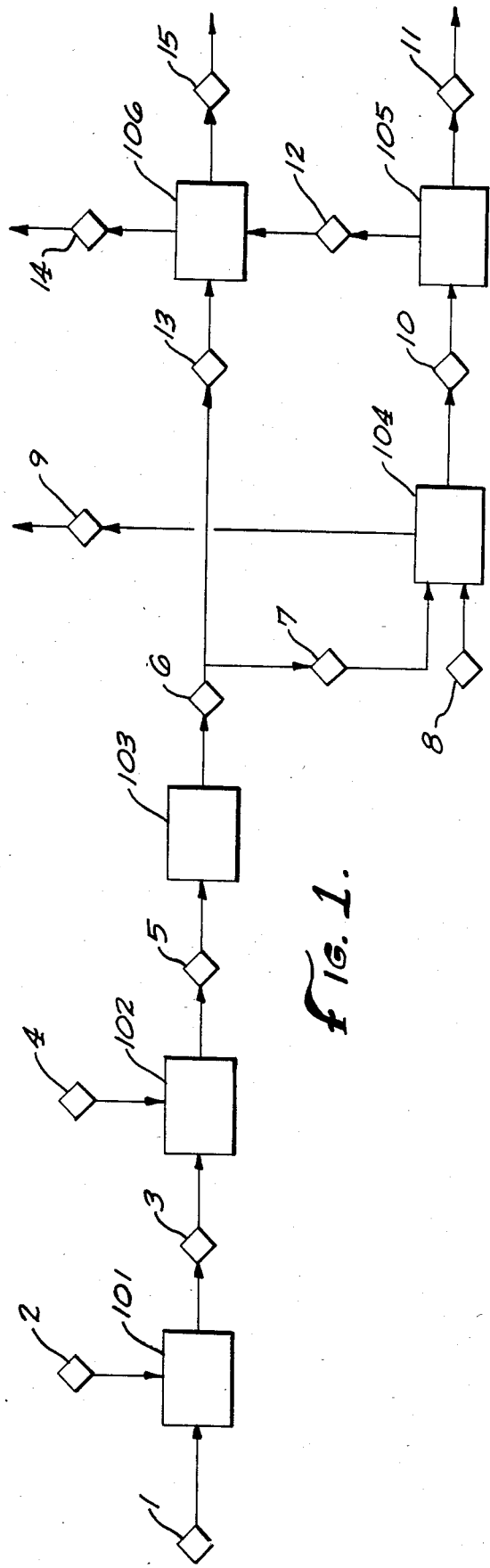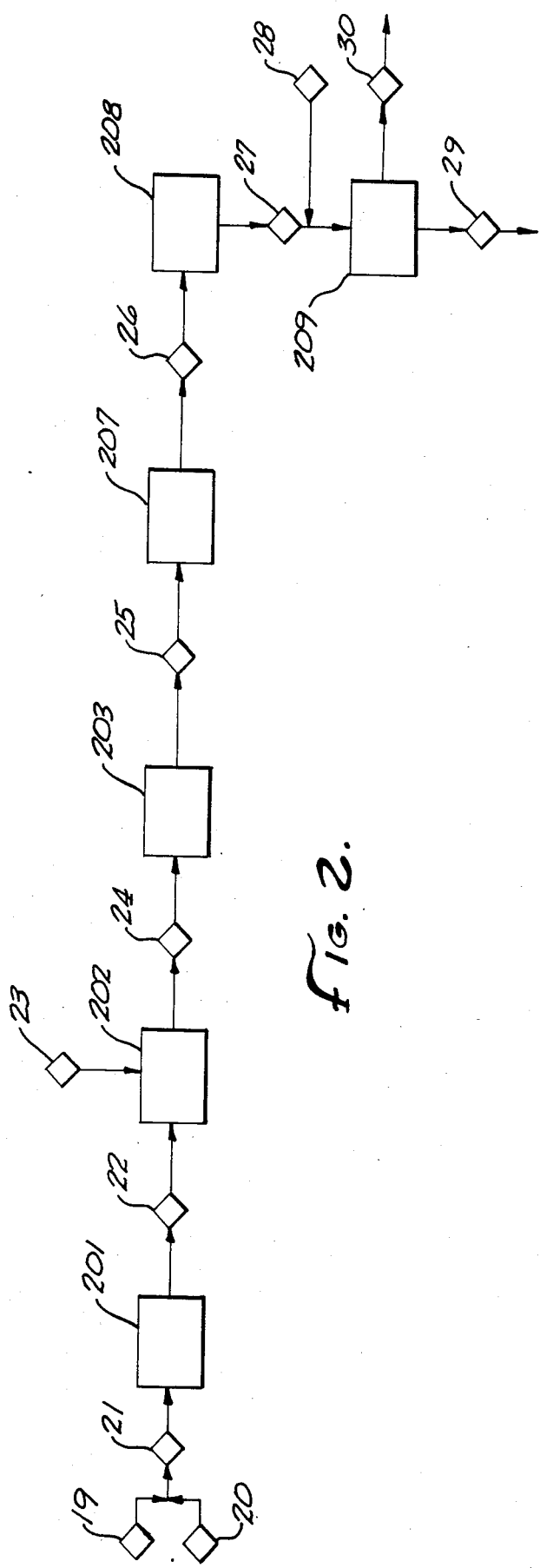

PROCESS FOR AMMONIA SYNGAS MANUFACTURE

BACKGROUND OF THE INVENTION

1. Field of the Invention

This invention relates to a process for producing $NH_3$ syngas in which a pressure swing adsorption unit and a fuel cell are employed.

2. Description of the Prior Art

The production of ammonia from natural gas is well known in the art. As described in U.S. Pat. No. 3,442,613, the disclosure of which is hereby specifically incorporated by reference, the following four chemical reactions are the principal reactions involved in a prior art ammonia process:

| | |
|---|---|
| Reforming Reaction - | |
| $CH_4 + H_2O \rightarrow CO + 3H_2$ | (endothermic) |
| Shift Reaction - | |
| $CO + H_2O \rightarrow CO_2 + H_2$ | (exothermic) |
| Oxidation Reaction - | |
| $H_2 + \frac{1}{2}O_2 \rightarrow H_2O$ | (exothermic) |
| Ammonia Synthesis - | |
| $3/2\ H_2 + \frac{1}{2}N_2 \rightarrow NH_3$ | (exothermic) |

A conventional process for producing ammonia synthesis gas begins with the introduction of a feed stream, steam and air into a reforming stage which may involve one or two steps. Conventional primary reforming has been described, for example, in U.S. Pat. No. 3,132,010. In conventional secondary reforming, air is added to the effluent from the primary reformer to introduce nitrogen for the synthesis gas and oxygen which reacts with the combustible components to form oxides of carbon.

The reforming stage is followed by a purification stage, the first step of which is the slightly exothermic shift conversion reaction. This step conventionally involves high temperature catalytic conversion followed by low temperature catalytic conversion. The $CO_2$ is then removed through a wash step. CO and $CO_2$ which remain after shift conversion and washing are then converted into methane in a methanation reaction. Methane can be removed in a final purification step as outlined in U.S. Pat. No. 3,442,613 or allowed to concentrate in the synthesis loop and purged to fuel as in the prior art. A recycle stream from the downstream ammonia synthesis may be added between the reversed reforming reaction and the final purification step. The ammonia synthesis gas leaving the final purification step will have a trace of argon (less than 1%) and a hydrogen to nitrogen mole ratio of 3:1. However, this previous technology utilizes a number of steps, each of which requires careful maintenance and a sizeable initial capital investment, both of which are major variables in the cost of modern syngas production. Accordingly, there exists a need to reduce the cost to produce ammonia syngas by reducing the steps of the process while minimizing operational maintenance.

SUMMARY OF THE INVENTION

In the present invention, a pressure swing absorption unit for gas purification is utilized in a process for producing ammonia synthesis gas. In another aspect of the present invention, a fuel cell is utilized to generate electric energy and a purge stream for the pressure swing adsorption unit.

The process of the present invention reduces the number of steps necessary for the production of $NH_3$ synthesis gas in a prior art process by eliminating the $CO_2$ removal, methanator, drying and purification steps while still generating a "high purity" synthesis gas. At the same time, the present invention substitutes a pressure swing adsorption unit for prior processes which require considerable pressure drop, a substantial investment and often run into operational problems. The present invention also has the potential to reduce the energy required for the production of $NH_3$ synthesis gas as the efficiency of fuel cells is increased.

In the fuel cell, $H_2$, produced from hydrocarbons by steam-reforming, is used as a fuel source while air is added to the fuel cell as an oxidant. Unreacted $H_2$, together with $CO_2$ and $CH_4$ is removed from the fuel cell in a first gas stream and is used as fuel in the steam reformer. A second gas stream leaving the fuel cell consists of approximately 95% $N_2$ and 5% $O_2$. After $O_2$ is removed from the second gas stream in a deoxygenation unit, the high purity $N_2$ is utilized in a pressure swing adsorption unit as a purge stream. By introducing this purge stream to the pressure swing adsorption unit while adding additional air to the secondary reformer, a 3:1 $H_2$-$N_2$ ratio at the pressure swing adsorption exit stream is obtained for introduction to the ammonia synthesis loop of an ammonia production plant.

In the pressure swing adsorption unit, high purity syngas is produced by pressure swing adsorption over molecular sieves. A pressure swing adsorption purge gas containing all the impurities and 10 to 15% of the incoming $H_2$ is recycled to the steam reformer to be used as fuel. The purge gas minimizes the $H_2$ loss from the pressure swing adsorption unit while raising the $N_2$ content at the pressure swing adsorption unit exit, so the pressure swing adsorption exit gas composition is comparable to the purifier exit gas of a prior art process ($H_2$:74.8%, $N_2$:24.9%, Ar:0.3%). In addition, if a separate high purity $CO_2$ stream is required, the $CO_2$ may be removed upstream of the pressure swing adsorption unit and any imcomplete $CO_2$ slippage will be removed in the pressure swing adsorption unit. Thus, unlike the prior art, the $CO_2$ removal system in the present process need not be as complete as that previously required.

In the process of this invention, sufficient amounts of high pressure steam are generated via heat recovery to run the turbine drivers of syngas/recycle compressors further downstream in the syngas loop. Additionally, sufficient electrical power is generated in the fuel cell to power the process air compressor used in the reforming process. When the high pressure steam and the electrical power generated in the fuel cell are recycled into the ammonia synthesis production process as described further hereinafter, the net energy required to produce a given unit of ammonia is less than that of the prior art production while the overall ammonia production process is simplified.

Accordingly, it is a primary object of this invention to provide an improved process for producing ammonia synthesis gas.

This and further objects and advantages will be apparent to those skilled in the art in connection with the drawings and the detailed description of the preferred embodiment set forth below.

BRIEF DESCRIPTION OF THE DRAWINGS

Further details are explained below with the help of the examples illustrated in the attached drawings in which:

FIG. 1 is a schematic drawing showing a process in which ammonia synthesis gas is produced in accordance with prior art technology.

FIG. 2 is a schematic diagram of a process for producing ammonia synthesis gas in accordance with the present invention;

DESCRIPTION OF THE PREFERRED EMBODIMENT

FIG. 1 depicts a process in accordance with prior art technology. A steam stream 19 and a stock stream 20 are combined to produce a feed stream 21 which is fed into a primary reformer 201. The exit gas 22 from the primary reformer 201 is introduced into secondary reformer 202 in which a stream of air 23 is also introduced. The product stream 24 from the secondary reformer 202 is then introduced into a shift conversion unit 203 which typically involves a high-temperature shift catalytic conversion followed by a low temperature shift catalytic conversion to produce a product stream 25 which is then introduced into a $CO_2$ removal unit 207. The product 26 from the $CO_2$ removal unit is then introduced into methanator 208 and the product 27 is then combined with a recycle stream 28 and introduced into driers and a purifier 209 which produces a vent stream 29 and an ammonia syngas stream 30.

FIG. 2 depicts a process in accordance with the present invention. An initial feed stream 1 is introduced into a primary reformer 101. A steam stream 2 is also introduced into the primary reformer 101. The exit gas 3 from the primary reformer 101 is passed into a secondary reformer 102 into which an air stream 4 is also introduced. The exit gas 5 from the secondary reformer 102 undergoes a high temperature shift conversion in a high temperature or high temperature and low temperature shift converter 103. After the shift, stream 6 is split into stream 13, which is introduced to a pressure swing adsorption unit 106, and stream 7, which is introduced to a fuel cell 104.

Air is also introduced into fuel cell 104 by stream 8. In the fuel cell, which may use a phosphoric acid fuel cell system available, by way of example only, from United Technologies Corporation, hydrogen and oxygen are reacted electrochemically to produce dc power and product water vapor. Approximately 80% of the hydrogen is reacted and 60% of the theoretical heat of reaction is converted to electric power. A first stream 9 of unreacted $H_2$, together with $CO_2$ and $CH_4$ is removed from the fuel cell and is used as fuel in the steam reformer. A second gas stream 10 leaving the fuel cell consists of approximately 95% $N_2$ and 5% $O_2$ and is introduced into a de-oxgenation unit 105. Stream 11 from deoxygenation unit 105 is vented. Stream 12 from de-oxygenation 105 unit comprising nitrogen is introduced into the pressure swing absorption unit 106 as a purge stream.

Stream 15 leaving pressure swing adsorption unit 106 is the final ammonia synthesis gas which is introduced to the ammonia synthesis stage, while stream 14 leaving pressure swing adsorption unit 106 may be utilized as fuel in the steam reformer. A suitable pressure swing adsorption unit, by way of example only, is commercially available from Union Carbide Engineering Products and Processes.

To better illustrate the process of the present invention, material balances have been prepared for the processes depicted in FIG. 1 and FIG. 2. Table 1 contains a material balance for the streams of FIG. 1 while Table 2 contains a material balance for the streams of FIG. 2. Both of the material balances are based upon examples having the same feed stock flow. It is to be understood that the process gas waste heat boiler, the steam super heater, the synloop steam generator and the like have been omitted from the drawings to simplify the description thereof, and the use and design of such equipment at appropriate places is deemed to be well within the scope of one skilled in the art.

The invention will be further illustrated in the example that follows wherein a detailed analysis of the net energy consumption of the present process is given.

Sufficient power is generated in the fuel cell for the process air compressor. In the fuel cell, 667 lb mol/hr $H_2$ are converted. The power generated is 15,000 HP. Approximately 28 MM BTU/hr low pressure steam is also produced.

The primary reformer outlet temperature is arbitrarily set at 1400° F. in the example described herein. The $CH_4$-slip from the secondary reformer is 1.23% (dry). This methane is used as primary reformer fuel via the PSA-purge described below.

In the pressure swing absportion unit, CO, $CO_2$, $H_2O$ and $CH_4$ are completely removed while 50% of the Ar is removed. The recovery of the $H_2$ is approximately 85% while the recovery of the combined $N_2$-streams is approximately 50%. Thus, the high purity stream from the de-oxygenation unit is used for pressure swing adsorption-purging and enhances the $H_2$ recovery by partially compensating for the greater loss of nitrogen, rather than hydrogen, in the pressure swing adsorption unit. In the de-oxygenation unit $O_2$ and $H_2O$ are reduced to the 1-10 ppm level.

The $NH_3$ production is 42.3 ST/hr. The total low heating value of the purge gas from the fuel cell and pressure swing adsorption unit is 303 MM BTU/hr. The primary reformer absorbed duty is 184.3 MM BTU/hr. The net heat release at approximately 55% box efficiency (on fuel) is 335 MM BTU/hr with additional natural gas (NG) fuel of 32 MM BTU/hr. If it is desired that no additional NG fuel be needed, the methane slip can be increased by reducing the primary reformer outlet temperature.

The heat content of the feed in the present example is 57993 lb/hr at an approximate low heating value of 19676 BTU/lb or 1140 MM BTU/hr. The total energy for feed and fuel is 27.7 MM BTU/ST which represents a plant generating sufficient steam for the syngas/recycle and refrigeration compressors further downstream in the ammonia loop as well as electric power for the process air compressor.

Having fully described the present invention, it will be apparent to those skilled in the art that modifications to the process herein described may be made without departing from the scope of the present invention. Therefore, the scope of this invention is not intended to be limited except as may be required by the lawful scope of the following claims.

TABLE 1

| | 21 | 22 | 23 | 24 | 25 | 26 | 27 | 28 | 29 | 30 |
|---|---|---|---|---|---|---|---|---|---|---|
| $H_2$ | — | 3830.4 | — | 7689.7 | 9295.5 | 9244.5 | 9030.6 | 323.0 | 99.4 | 9254.2 |
| $N_2$ | 126.4 | 126.4 | 4498.9 | 4647.7 | 4647.7 | 4640.6 | 4640.6 | 107.0 | 1662.9 | 3084.7 |
| $O_2$ | — | — | 1207.4 | — | — | — | — | — | — | — |
| Ar | — | — | 54.0 | 54.0 | 54.0 | 54.0 | 54.0 | 24.0 | 46.7 | 31.3 |
| CO | — | 267.9 | — | 1662.4 | 56.5 | 55.9 | — | — | — | — |
| $CO_2$ | 18.7 | 848.8 | 1.7 | 1373.2 | 2979.1 | 11.5 | — | — | — | — |
| $CH_4$ | 2780.8 | 2277.2 | — | 360.0 | 360.0 | 358.7 | 426.2 | — | 426.2 | — |
| $C_2H_6$ | 139.0 | — | — | — | — | — | — | — | — | — |
| $C_3H_8$ | 63.2 | — | — | — | — | — | — | — | — | — |
| $C_4H_{10}$ | 31.6 | — | — | — | — | — | — | — | — | — |
| Dry | — | — | — | 15787.0 | — | — | — | — | — | — |
| $H_2O$ | 9112.0 | 7184.4 | 40.0 | 7199.4 | 5593.6 | — | — | — | — | — |

TABLE 2

| | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| $H_2$ | — | — | 5547.8 | — | 8362.2 | 9710.8 | 834.0 | — | 167.0 | — | — | — | 8876.8 | 1355.8 | 7521.0 |
| $N_2$ | 126.4 | — | 126.4 | 3877.0 | 4003.4 | 4003.4 | 343.8 | 1906.0 | 343.8 | 1906.0 | 572.0 | 1334.0 | 3659.6 | 2486.6 | 2507.0 |
| $O_2$ | — | — | — | 1040.5 | — | — | — | 476.0 | — | 143.0 | 143.0 | — | — | — | — |
| Ar | — | — | — | 46.5 | 46.5 | 46.5 | 4.0 | 24.0 | 4.0 | 24.0 | — | 24.0 | 42.5 | 33.1 | 33.4 |
| CO | — | — | 683.7 | — | 1983.6 | 635.1 | 54.5 | — | 54.5 | — | — | — | 580.6 | 580.6 | — |
| $CO_2$ | 18.7 | — | 966.3 | 1.5 | 1216.7 | 2565.3 | 220.3 | — | 220.3 | — | — | — | 2345.0 | 2345.0 | — |
| $CH_4$ | 2780.8 | — | 1743.8 | — | 195.0 | 195.0 | 16.7 | — | 16.7 | — | — | — | 178.3 | 178.3 | — |
| $C_2H_6$ | 137.0 | — | — | — | — | — | — | — | — | — | — | — | — | — | — |
| $C_3H_8$ | 63.2 | — | — | — | — | — | — | — | — | — | — | — | — | — | — |
| $C_4H_{10}$ | 31.6 | — | — | — | — | — | — | — | — | — | — | — | — | — | — |
| Dry | — | — | — | — | 15807.4 | 17156.1 | 1473.3 | — | — | — | — | — | — | — | — |
| $H_2O$ | — | 9112.0 | 6533.6 | 34.5 | 6851.4 | 5502.8 | — | — | — | — | — | — | — | 6979.4 | 10061.4 |

What is claimed is:

1. A process for reforming hydrocarbons to obtain a synthesis gas containing an approximately stoichiometric amount of hydrogen and nitrogen and substantially no methane from which ammonia may be formed, which comprises:
    (a) reacting a hydrocarbon with steam and air in a reforming operation to obtain a first effluent comprising water, hydrogen, nitrogen, and carbon monoxide;
    (b) reacting carbon monoxide in said first effluent with water in a shift conversion stage to produce a second effluent comprising hydrogen, nitrogen and carbon dioxide, said second effluent being separated into a first stream and a second stream;
    (c) reacting the hydrogen in said first stream with air in a fuel cell to produce electricity and a product stream comprising nitrogen and oxygen;
    (d) removing substantially all of the oxygen from said product stream to produce a purified stream; and
    (e) passing said second stream and said purified stream into a pressure swing adsorption unit in which a synthesis gas and a waste fuel stream are produced.

2. A process for reforming hydrocarbons to obtain a synthesis gas containing an approximately stoichiometric amount of hydrogen and nitrogen from which ammonia may be formed, which comprises:
    (a) reacting a hydrocarbon with steam in a primary reforming operation to obtain a first effluent comprising hydrogen, carbon oxides including carbon monoxide, steam and a reduced amount of the hydrocarbon;
    (b) reacting said first effluent with air in a secondary reforming operation to obtain a second effluent comprising water, hydrogen, nitrogen, carbon oxides including carbon monoxide, and residual hydrocarbon;
    (c) reacting carbon monoxide in said second effluent with water in one or more shift operations to produce a third effluent which is separated into a first stream and a second stream;
    (d) reacting hydrogen from said first stream with air in a fuel cell to produce electric power, water, a byproduct and a product stream comprising nitrogen and oxygen, said byproduct being used as fuel in the primary steam reforming operation, said product stream being passed into a de-oxygenation operation in which substantially all of the oxygen is removed to produce a purified stream; and
    (e) passing said second stream into a pressure swing adsorption unit in which an ammonia synthesis gas is separated from a recycle fuel stream, said purified stream being utilized as a purge stream in the separation of said recycle fuel stream from said ammonia synthesis gas.

3. A process for reforming hydrocarbons to obtain a synthesis gas containing an approximately stoichiometric amount of hydrogen and nitrogen from which ammonia may be formed which comprises:
    (a) reacting a hydrocarbon with steam in a primary reforming operation to obtain a first effluent comprising hydrogen, carbon monoxide, and steam;
    (b) reacting said first effluent with air in a secondary reforming operation to obtain a second effluent comprising water, hydrogen, nitrogen and carbon monoxide;
    (c) reacting said carbon monoxide in the second effluent with water in a catalytic shift operation to produce a third effluent which is separated into a first stream and a second stream;
    (d) reacting hydrogen from said first stream with air in a fuel cell to produce water, a product stream comprising nitrogen and oxygen, a byproduct stream and electric power, said byproduct stream being utilized as a first recycle fuel stream;
    (e) passing said product stream into a deoxygenation unit in which the oxygen is removed from said product stream to produce a purified stream comprised of nitrogen and a vent stream;

(f) passing said second stream into a pressure swing adsorption unit in which said ammonia synthesis gas is separated from said second stream to produce a second recycle fuel stream, said purified stream being utilized as a purge stream in the separation of the ammonia synthesis gas from said second recycle fuel stream.

4. A process for producing ammonia synthesis gas and carbon dioxide from a hydrocarbon feed stream, comprising the steps of:
   (a) reacting a hydrocarbon with steam and air in a reforming operation to obtain a first effluent comprising water, hydrogen, nitrogen and carbon monoxide;
   (b) reacting carbon monoxide in said first effluent with water in a catalytic shift conversion operation to produce a second effluent comprising hydrogen, nitrogen and carbon dioxide, said second effluent being separated into a first stream and a second stream;
   (c) reacting the hydrogen in said first stream with air in a fuel cell to produce electric power, water, a byproduct recycle fuel stream and a product stream comprising nitrogen and oxygen;
   (d) removing substantially all the oxygen from said product stream to produce a purified stream;
   (e) passing said second stream into a carbon dioxide removal unit in which a first portion of the carbon dioxide present in the second stream is removed from the second stream to produce a modified second stream;
   (f) passing said modified second stream and the purified stream into a pressure swing adsorption unit in which the synthesis gas is separated from a waste fuel stream comprising a second portion of carbon dioxide, said purified stream being utilized as a purge stream in the separation of said synthesis gas from said waste fuel.

5. A process for reforming hydrocarbons to obtain a synthesis gas containing an approximately stoichiometric amount of hydrogen and nitrogen from which ammonia may be produced, which comprises:
   (a) reacting a hydrocarbon with steam in a primary reforming operation to obtain a first effluent comprising hydrogen, carbon oxides including carbon monoxide, steam and a reduced amount of the hydrocarbon;
   (b) reacting said first effluent with air in a secondary reforming operation to obtain a second effluent comprising water, hydrogen, nitrogen, carbon oxides including carbon monoxide and a residual quantity of hydrocarbons;
   (c) reacting the carbon monoxide in said second effluent with water in a high pressure catalytic shift operation to produce a third effluent which is separated into a first stream and a second stream;
   (d) reacting hydrogen from said first stream with air in a fuel cell to produce electric power, water, a byproduct stream which is a first recycle fuel stream, and a product stream comprised of nitrogen and oxygen;
   (e) passing said product stream into a de-oxygenation unit in which substantially all of the oxygen is removed from said product stream to produce a purified stream comprising nitrogen and a vent stream;
   (f) passing said second stream into a pressure swing adsorption unit in which substantially all of the carbon oxides, water and unreacted hydrocarbons are removed from said second stream to produce said synthesis gas and a second recycle fuel stream, said purified stream being utilized as a purge stream in the pressure swing adsorption unit.

6. A process as recited in claim 5 wherein at least 85 percent of the hydrogen produced in both the primary reforming operation and the secondary reforming operation is recovered in the synthesis gas while approximately 50% of the nitrogen introduced to the process as air in both the secondary reforming operation and the fuel cell is recovered as nitrogen in the synthesis gas.

7. A process as recited in claim 6 wherein the product stream is comprised of approximately 95% nitrogen.

8. An improved process for reforming hydrocarbons to obtain a synthesis gas containing an approximately stoichiometric amount of hydrogen and nitrogen from which ammonia may be formed in which a hydrocarbon is reacted with steam and air in a reforming operation to obtain a first effluent comprising hydrogen, nitrogen and carbon monoxide, the carbon monoxide being reacted in a shift conversion stage to produce a second effluent comprising hydrogen, nitrogen, and carbon dioxide, said improved process comprising the additional steps of separating said second effluent into a first stream and a second stream, said first stream being reacted with air in a fuel cell to produce a byproduct stream and a product stream which is passed through a de-oxygenation stage to produce a purified stream, said second stream and said purified stream being passed into a pressure swing adsorption unit in which the synthesis gas and a waste fuel stream are separated.

* * * * *